(12) United States Patent
McGrath

(10) Patent No.: US 6,807,617 B2
(45) Date of Patent: Oct. 19, 2004

(54) PROCESSOR, METHOD AND APPARATUS WITH DESCRIPTOR TABLE STORING SEGMENT DESCRIPTORS OF VARYING SIZE

(75) Inventor: Kevin J. McGrath, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 489 days.

(21) Appl. No.: 09/824,995

(22) Filed: Apr. 2, 2001

(65) Prior Publication Data

US 2002/0144080 A1 Oct. 3, 2002

(51) Int. Cl.[7] ............................................. G06F 13/00
(52) U.S. Cl. ....................................... 711/208; 711/206
(58) Field of Search .............................. 711/206, 208, 711/220

(56) References Cited

U.S. PATENT DOCUMENTS

| | | | |
|---|---|---|---|
| 4,620,274 A | | 10/1986 | Boothroyd et al. .......... 711/217 |
| 4,701,946 A | | 10/1987 | Oliva et al. ............ 379/102.04 |
| 4,864,493 A | * | 9/1989 | Kishi ........................ 711/221 |
| 5,381,537 A | | 1/1995 | Baum et al. ................ 711/206 |
| 5,479,627 A | | 12/1995 | Khalidi et al. ............... 711/205 |
| 5,481,684 A | | 1/1996 | Richter et al. .............. 712/212 |
| 5,517,651 A | | 5/1996 | Huck et al. ................. 712/229 |
| 5,617,554 A | | 4/1997 | Alpert et al. ............... 711/208 |
| 5,644,755 A | | 7/1997 | Wooten ........................ 703/23 |
| 5,692,167 A | | 11/1997 | Grochowski et al. ....... 712/712 |
| 5,758,116 A | | 5/1998 | Lee et al. ................... 712/210 |
| 5,774,686 A | | 6/1998 | Hammond et al. ......... 712/209 |
| 5,784,638 A | | 7/1998 | Goetz et al. .................. 712/43 |
| 5,787,495 A | | 7/1998 | Henry et al. ................ 711/208 |
| 5,826,074 A | | 10/1998 | Blomgren ................... 712/234 |
| 6,086,623 A | | 7/2000 | Broome et al. ............... 703/26 |
| 6,560,694 B1 | * | 5/2003 | McGrath et al. ............ 712/210 |
| 6,571,330 B1 | * | 5/2003 | McGrath et al. ............ 712/210 |
| 2002/0019902 A1 | * | 2/2002 | Christie ...................... 710/260 |

OTHER PUBLICATIONS

Intel, "Intel Architecture Software Developer's Manual, vol. 1: Basic Architecture," 1997, pp. 3–1–3–15.
Intel, "Pentium Pro Family Developer's Manual, vol. 3: Operating System Writer's Guide," 1996, pp. 2–1–2–21, 3–1–3–33, and 4–1–4–29.
*The Technology Behind Crusoe™ Processors, Low–Power x86–Compatible Processors Implemented with Code Morphing™ Software*, Transmeta Corporation, Jan. 2000, pp. 1–18.
*Alpha Learns to Do Windows; Digital's FX!32 is The Key To Running Win32 Software on Alpha/Windows NT.*, Selinda Chiquoine, BYTE, Oct. 1996, 4 pages.

(List continued on next page.)

*Primary Examiner*—Glenn Gossage
(74) *Attorney, Agent, or Firm*—Lawrence J. Merkel; Meyertons, Hood, Kivlin, Kowert & Goetzel, P.C.

(57) ABSTRACT

A processor, apparatus and method for storing segment descriptors of different sizes in a segment descriptor table are disclosed. Smaller segment descriptors may be segment descriptors similar to the x86 architecture definition, and larger segment descriptors may be used to provide virtual addresses (e.g. base addresses or offsets) having more the 32 bits. By providing a segment descriptor table that stores different sized segment descriptors, maintaining multiple segment descriptor tables for different operating modes may be avoidable while providing support for segment descriptors having addresses greater than 32 bits. In one embodiment, the larger segment descriptors may be twice the size of the smaller segment descriptors. The segment descriptor table may comprise entries, each capable of storing the smaller segment descriptor, and a larger segment descriptor may occupy two entries of the table. The larger segment descriptor may be a call gate descriptor, a local descriptor table descriptor or a task state segment descriptor.

30 Claims, 15 Drawing Sheets

OTHER PUBLICATIONS

*Awards Stack Up for Digital FX!32 Windows Compatibility Software for Alpha*, Digital Press Releases, Jun. 25, 1997.
*Digital FX!32; White Paper: How Digital FX!32 Works*, Digital Semiconductor, Sep. 26, 1997.
*An Alpha in PC Clothing; Digital Equipment's New x86 Emulator Technology Makes An Alpha System a Fast x86 Clone*, Tom Thompson, BYTE, Feb. 1996, 7 pages.
*AMD 64–Bit Technology; The AMD x86 Architecture Programmers Overview*, AMD, Publication #24108 Rev: A, Aug. 2000, pp. 1–106.

*AMD 64–Bit Technology; The AMD x86–64 Architecture Programmers Overview*, AMD, Publication #24108 Rev: C, Jan. 2001, pp. 1–128.

"Pentium Processor Family Developers Manual," vol. 3, Architecture and Programming Manual, Intel, 1995, pp. 3–1 to 3–24, 10–1 to 10–13, 11–1 to 11–25.

"Advanced 80386 Programming Techniques," James L. Turley, Osborne McGraw–Hill, Berkeley, CA, 1988, pp. 45–84 and 283–315.

* cited by examiner

| LMA | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

PROCESSOR, METHOD AND APPARATUS WITH DESCRIPTOR TABLE STORING SEGMENT DESCRIPTORS OF VARYING SIZE

BACKGROUND OF THE INVENTION

1. Field of the Invention

This invention is related to the field of processors and, more particularly, to segment descriptor tables for storing segment descriptors used by the processor.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

As computer systems have continued to evolve, 64 bit address size (and sometimes operand size) has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64 bit address and/or operand sizes.

Unfortunately, the x86 architecture is limited to a maximum 32 bit operand size and 32 bit address size. The operand size refers to the number of bits operated upon by the processor (e.g. the number of bits in a source or destination operand). The address size refers to the number of bits in an address generated by the processor. Thus, processors employing the x86 architecture may not serve the needs of applications which may benefit from 64 bit address or operand sizes.

One of the reasons that the x86 architecture is limited to 32 bit address size is a segmentation mechanism employed as part of the address translation mechanism. Segment descriptors in a segment table provide a segment base address (of 32 bits) which is added to other operands of an instruction to produce a linear address.

SUMMARY OF THE INVENTION

A segment descriptor table is described which stores segment descriptors of different sizes. Smaller segment descriptors may be segment descriptors similar to the x86 architecture definition, and larger segment descriptors may be used to provide virtual addresses (e.g. base addresses or offsets) having more than 32 bits. By providing a segment descriptor table that stores different sized segment descriptors, maintaining multiple segment descriptor tables for different operating modes may be avoidable while providing support for segment descriptors having addresses greater than 32 bits. In one embodiment, the larger segment descriptors may be twice the size of the smaller segment descriptors. The segment descriptor table may comprise entries, each capable of storing the smaller segment descriptor, and a larger segment descriptor may occupy two entries of the table.

Broadly speaking, a memory is contemplated. The memory stores at least one descriptor table storing at least a first segment descriptor and a second segment descriptor. The second segment descriptor is larger than the first segment descriptor. An apparatus including the memory and a processor is also contemplated.

Additionally, a method is contemplated. A first segment descriptor is stored in a segment descriptor table. A second segment descriptor is stored in the segment descriptor table. The second segment descriptor is larger than the first segment descriptor.

BRIEF DESCRIPTION OF THE DRAWINGS

The following detailed description makes reference to the accompanying drawings, which are now briefly described.

FIG. 4 is a table illustrating one embodiment of operating modes as a function of segment descriptor and control register values.

Figure 1:
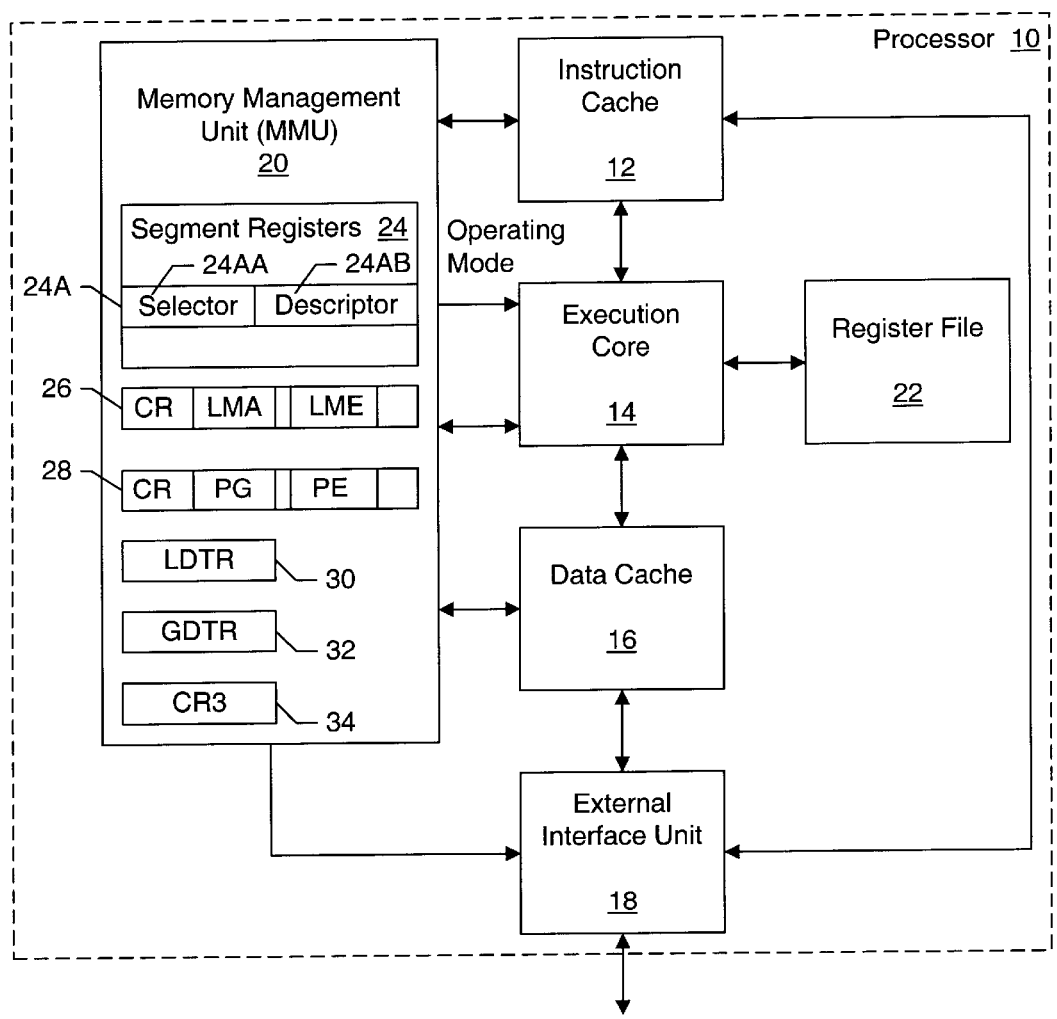
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Overview

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, a global descriptor table register (GDTR) 32, and a page table base address register (CR3) 34. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Processor 10 may employ a processor architecture compatible with the x86 architecture (also known as the IA-32 architecture) and including additional architectural features to support 64 bit processing. More particularly, the processor architecture employed by processor 10 may define a mode, referred to below as "long mode". Long mode is a mode in which 64 bit processing is selectable as an operating mode, as well as 32 bit or 16 bit processing as specified in the x86 architecture. More particularly, long mode may provide for an operating mode in which virtual addresses may be greater than 32 bits in size.

Processor 10 may implement a mechanism allowing for orderly transition to and from long mode, even though multiple registers may be changed to perform the transition. Particularly, processor 10 may employ a long mode active (LMA) indication in a control register (e.g. control register 26 in the present embodiment, although the LMA indication may be stored in any control register, including control registers not storing the long mode enable (LME) indication). The processor 10 may use the LMA indication as the indication of whether or not long mode is active (i.e. whether or not the processor is operating in long mode). However, the LMA indication may not be modified directly via an instruction. Instead, an instruction is used to change the state of the LME indication to indicate whether or not long mode is desired. Long mode may be activated (as indicated by the LMA indication) via the combination of enabling paging (as indicated by the PG indication in control register 28 and described in more detail below) and the LME indication indicating that long mode is desired. Viewed in another way, the LME indication may be used to enable the transition to long mode. The LMA indication may indicate whether or not the transition has successfully occurred, and thus indicates whether processor 10 is operating according to the long mode definition or processor 10 is operating according to the legacy definition of the x86 processor architecture.

Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands. As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define a segment of memory and to further define access control and status for the segment. A "segment descriptor table" is a table in memory storing segment descriptors.

In the illustrated embodiment, MMU 20 determines an operating mode and conveys information regarding the operating mode to execution core 14. Execution core 14 executes instructions in accordance with the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, information used to generate the operating mode may be shadowed locally in the portions of processor 10 which use the operating mode (e.g. execution core 14), and the operating mode may be determined from the local shadow copies.

As mentioned above, MMU 20 determines the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores a long mode enable (LME) indication which is used to enable transition to long mode and the LMA indication indicating whether or not long mode is active. In long mode, an operating mode in which the default address size is greater than 32 bits ("32/64 mode") as well as certain compatibility modes for the 32 bit and 16 bit operating modes may be available using the segment descriptor indications. The default operand size may be 32 bits in 32/64 mode, but instructions may override the default 32 bit operand size with a 64 bit operand size when desired. If the LME indication is in an enabled state, then long mode may be activated. If the LME indication is in a disabled state, then long mode may not be activated. In one embodiment, the default address size in 32/64 mode may be implementation-dependent but may be any value up to and including 64 bits. Furthermore, the size of the virtual address may differ in a given implementation from the size of the physical address in that implementation.

It is noted that various indications are described herein (e.g. LMA, LME, etc.). Generally, an indication is a value which may be placed into two or more states. Each state may be assigned a meaning. Some of the indications described herein (including some enable indications) may be described as bits. The bit being set may be one state (e.g. the enabled state for enable indications) and the bit being clear may be the other state (e.g. the disabled state for enable indications). However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above. Similarly, the LMA indication may be referred to as the LMA bit, with the set state indicating that long mode is active and the clear state indicating that long mode is inactive. However, other encodings of the LMA indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector identifies the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and an index within the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change.

In one embodiment, only the CS segment register is used in 32/64 mode. The data segment registers are ignored from the standpoint of providing segmentation information. In 16 and 32 bit modes, the code segment and data segments may be active. Furthermore, a second enable indication (PE or protect enable) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above.

Control register 28 is further illustrated in FIG. 1 as storing a paging enable indication (PG). The PG indication may indicate whether or not paging is enabled. As mentioned above, the LMA bit is set once paging is enabled and the LME bit is set. As used herein, the term "paging" or "paging address translation" refers to the translation of virtual addresses to physical addresses using mappings stored in a page table structure indicated by the page table base address register 34. A given page mapping maps any virtual address having the same virtual page number to a corresponding physical address in a page of physical memory. The page table is a predefined table of entries stored in memory. Each of the entries stores information used to map virtual addresses to physical addresses.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode. Generally, the control registers are each addressable by one or more instructions defined in the processor architecture, so that the registers may be changed as desired.

Instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice. Additionally, embodiments of execution core 14 may employ any of the above constructions and may include microcoding, as desired.

Register file 22 may include 64 bit registers which may be accessed as 64 bit, 32 bit, 16 bits, or 8 bits registers as indicated by the operating mode of processor 10 and any overrides for a particular instruction. The registers included in register file 22 may include the RAX, RBX, RCX, RDX, RDI, RSI, RSP, and RBP registers (which may be 64 bit versions of the EAX, EBX, ECX, EDX, EDI, ESI, ESP, and EBP registers defined in the x86 processor architecture, respectively). Additionally, in one embodiment, register file 22 may include additional registers addressed using a register extension (REX) prefix byte. Register file 22 may further include an RIP register, which may be a 64 bit version of the EIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

While the processor architecture described herein may be compatible with the x86 processor architecture for 16 and 32 bit modes, in one embodiment, other embodiments may employ any 16 and 32 bit modes. The other embodiments may or may not be compatible with the x86 processor architecture or any other processor architecture. It is further noted that, while a specific set of information is described herein as being used to generate the operating mode, any combination of indications and/or information from memory data structures such as segment descriptor tables and page tables may be used to generate the operating mode in various embodiments.

Figure 2:
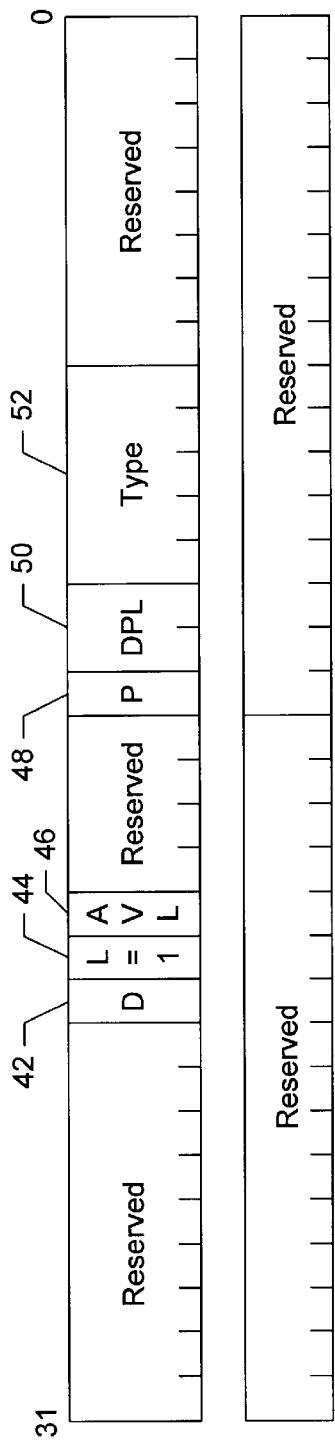
FIG. 2 is a block diagram of one embodiment of a segment descriptor for 32/64 mode.

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bits code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bits modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 4 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Figure 3:
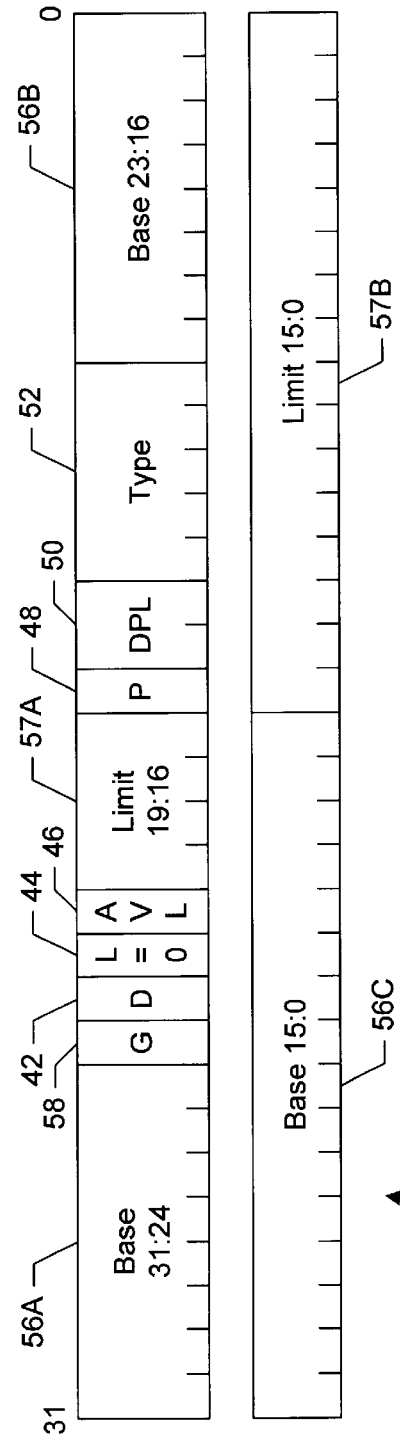
FIG. 3 is a block diagram of one embodiment of a segment descriptor for compatibility mode.

Turning now to FIG. 3, a block diagram of one embodiment of a code segment descriptor 54 for 32 and 16 bits compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (stored in the RIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4K byte pages (e.g. 12 least significant zeros are appended to the limit in the limit field). If G bit 58 is clear, the limit is used as is.

It is noted that code segment descriptors for 32 and 16 bits modes when long mode is not active may be similar to code segment descriptor 54, except the L bit is reserved and defined to be zero. It is further noted that, in 32 and 16 bits modes (both compatibility mode with the LMA bit set and modes with the LMA bit clear) according to one embodiment, data segments are used as well. Data segment descriptors may be similar to code segment descriptor 54, except that the D bit 42 is defined to indicate the upper bound of the segment or to define the default stack size (for stack segments).

Turning next to FIG. 4, a table 70 is shown illustrating the states of the LMA bit, the L bit in the code segment descriptor, and the D bit in the code segment descriptor and the corresponding operating mode of processor 10 according to one embodiment of processor 10. Other embodiments are possible and contemplated. If the LMA bit is clear, then the L bit is reserved (and defined to be zero). However, as table 70 illustrates, processor 10 may treat the L bit as a don't care if the LMA bit is clear. Thus, the x86 compatible 16 bits and 32 bit modes may be provided by processor 10 if the LMA bit is clear. If the LMA bit is set and the L bit in the code segment is clear, then a compatibility operating mode is established by processor 10 and the D bit selects 16 bits or 32 bit mode. If the LMA bit and the L bit are set and the D bit is clear, 32/64 mode is selected for processor 10. Finally, the mode which would be selected if the LMA, L and D bits are all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction.

Segment Descriptor Tables

Figure 5:
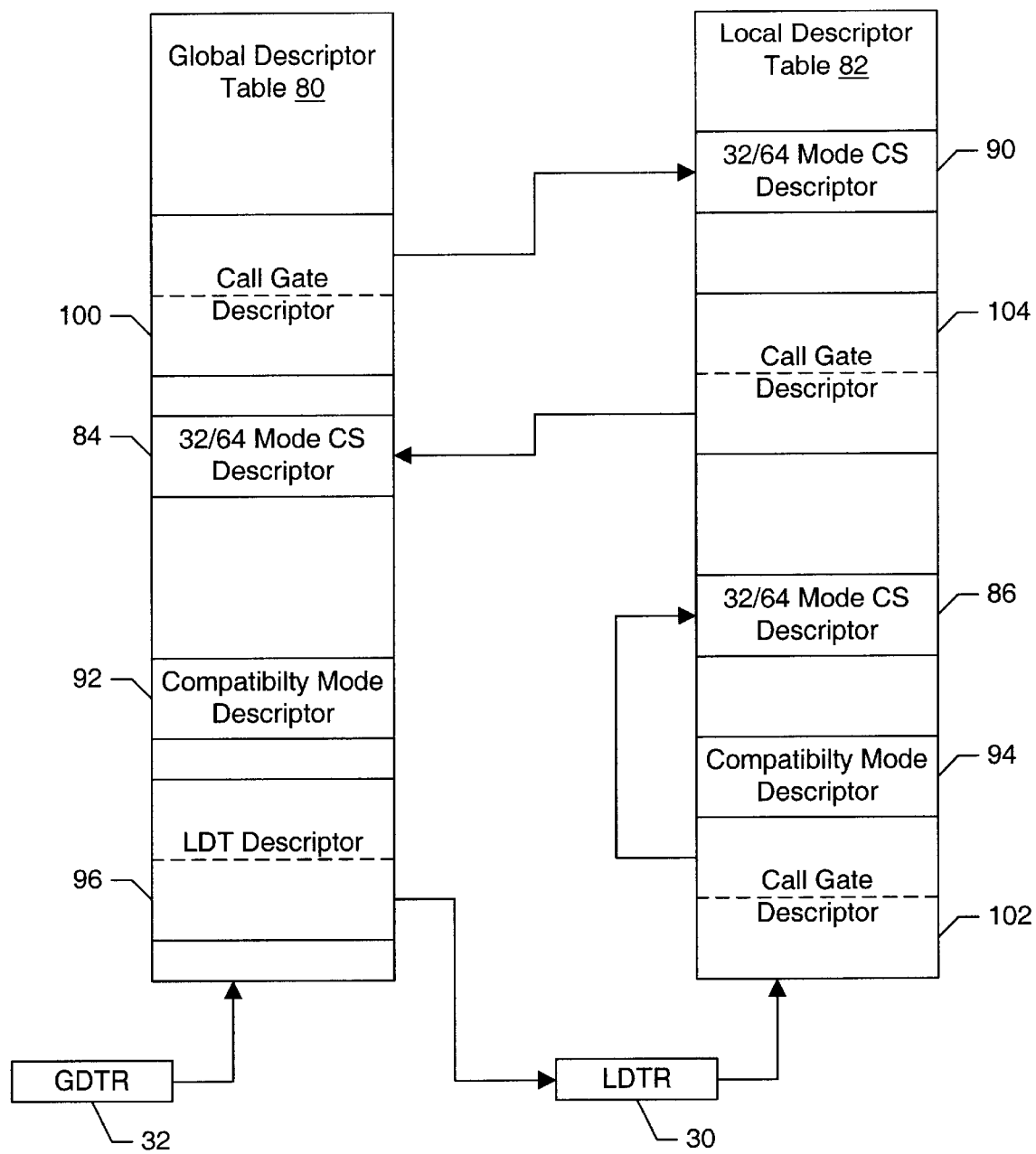
FIG. 5 is a block diagram of one embodiment of segment descriptor tables.

Turning next to FIG. 5, a block diagram is shown illustrating one embodiment of a global descriptor table 80 and a local descriptor table 82. Other embodiments are possible and contemplated. As illustrated in FIG. 5 and mentioned above, the base address of global descriptor table 80 is provided by GDTR 32 and the base address of local descriptor table 82 is provided by LDTR 30. Accordingly, to support placing global descriptor table 80 and local descriptor table 82 arbitrarily within the virtual address space, GDTR 32 and LDTR 30 may store 64 bit base addresses. If the LMA bit is clear, the least significant 32 bits of the base address may be used to locate the descriptor tables.

The global descriptor table 80 and the local descriptor table 82 may be configured to store segment descriptors of different sizes. Smaller segment descriptors may be the 16 and 32 bit mode descriptors or the 32/64 mode code segment descriptors, and larger segment descriptors may be used for long mode call gate, LDT, and TSS segment descriptors. Generally speaking, a first segment descriptor is larger than a second segment descriptor if the first segment descriptor includes at least one more bit than the second segment descriptor. In the illustrated embodiment, for example, segment descriptors of two sizes may be stored, 8 bytes and 16 bytes. The size of a given segment descriptor may be dependent on the type of the segment descriptor. For example, the call gate, LDT, and TSS segment descriptor types may be the larger segment descriptor size, and the code and data segment descriptor types may be the smaller segment descriptor size.

By storing different size segment descriptors in the segment descriptor tables 80 and 82, descriptors for 16 and 32 bit modes may be stored in the same tables as the descriptors which include 64 bit offsets or base addresses. Thus, applications operating in compatibility modes may have appropriate descriptors in the same segment descriptor tables as the 64 bit operating systems. Accordingly, maintaining separate descriptor tables for each mode may not be necessary.

Both global descriptor table 80 and local descriptor table 82 are configured to store segment descriptors of various types. For example, 32/64 mode code segment descriptors 84, 86, and 90 and compatibility mode descriptors 92 and 94 are illustrated in FIG. 5. Each of descriptors 84–94 occupies an entry in the corresponding descriptor table, where an entry is capable of storing one segment descriptor of the smaller size stored in the segment descriptor tables. For example, in one embodiment, an entry is capable of storing one segment descriptor of the size specified in the x86 architecture (e.g. 8 bytes for the embodiments illustrated in FIGS. 2 and 3). Another type of descriptor in global descriptor table 80 is a local descriptor table descriptor 96, which defines a system segment for the local descriptor table 82 and provides the base address stored in LDTR 30. LDTR 30 is initialized using a load LDTR (LLDT) instruction having as an operand a segment selector locating descriptor 96 in global descriptor table 80. Global descriptor table 80 may store multiple LDT descriptors locating different local descriptor tables, if desired. Since the LDT descriptor 96 may store a 64 bit offset if the LMA bit is set, LDT descriptor 96 may occupy two entries in global descriptor table 80. If the LMA bit is clear, LDT descriptor 96 may occupy a single entry in global descriptor table 80. Similarly, each task may have a task state segment (TSS) descriptor in one of descriptor tables 80 and 82 to store certain information related to the task. Accordingly, a TSS descriptor may occupy two entries to allow for TSS information to be stored anywhere in the 64 bit address space.

Figure 6:
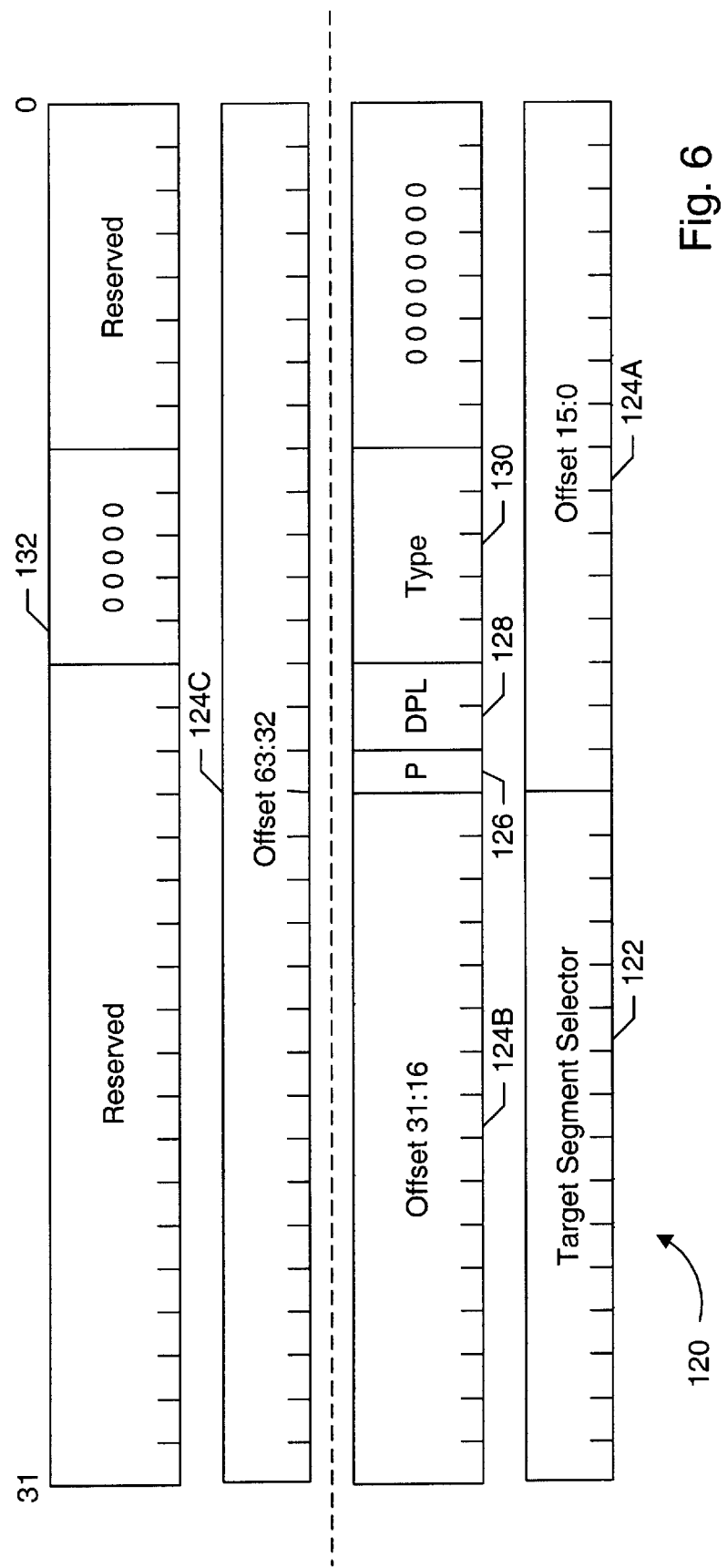
FIG. 6 is a block diagram of one embodiment of a call gate descriptor.

The local and global descriptor tables may also store a call gate descriptor. For example, FIG. 5 illustrates call gate descriptors 100, 102, and 104. Call gate descriptors support a 64 bit offset as well, and thus may occupy two entries in the corresponding descriptor table as well. An exemplary long mode call gate descriptor is illustrated in FIG. 6 below.

Generally, call gates are used to manage the transition between a code segment having a lesser privilege level and a code segment have a greater privilege level (e.g. an application program calling an operating system routine). The lesser privileged code includes a call or other branch instruction specifying, as a target, a segment selector (and an offset into the segment, which is ignored in this case). The segment selector identifies a call gate descriptor within the descriptor tables, which includes a minimum privilege level required to execute the greater privilege level code. When processor 10 executes the call or other branch instruction, processor 10 indexes the descriptor tables with the segment selector and locates the call gate. If the current privilege level of processor 10 and the requestor privilege level (which is part of the segment selector, and may be used to lower the current privilege level for privilege checking purposes) both reflect sufficient privilege (e.g. the privilege levels are numerically less than or equal to the minimum privilege level in the call gate descriptor), then the call may proceed. The call gate descriptor includes a segment selector for the target segment (the code segment having the greater privilege level) and the offset within the target segment at which code fetching is to begin. Processor 10 extracts the segment selector and the offset from the call gate descriptor and reads the target segment descriptor to begin fetching the code having the greater privilege level. On the other hand, if either the current privilege level or the requestor privilege level is a lesser privilege level than the minimum privilege level in the call gate descriptor (e.g. either the current or requestor privilege level is numerically greater than the minimum privilege level), processor 10 signals an exception after accessing the call gate descriptor and without accessing the target descriptor. Thus, access to code executing at greater privilege levels is carefully controlled.

As mentioned above, the call gate descriptor includes a target segment selector and offset within the segment. The reference to the target segment descriptor is illustrated in FIG. 5 as an arrow from a call gate descriptor to another descriptor. For example, call gate descriptor 100 references 32/64 mode descriptor 90; call gate descriptor 102 references 32/64 mode descriptor 86, and call gate descriptor 104 references 32/64 mode descriptor 84. As FIG. 5 illustrates, a call gate descriptor may be stored in either descriptor table and may reference a descriptor in the other table or in the same table. Furthermore, a call gate descriptor may reference either a 32/64 mode descriptor or a compatibility mode descriptor.

Generally, when processor 10 reads a descriptor from one of the descriptor tables using a segment selector, one descriptor table entry is read. However, if the LMA bit is set and processor 10 detects that the entry is a call gate descriptor, an LDT descriptor, or a TSS descriptor, processor 10 reads the next succeeding entry in the table to obtain the remainder of the descriptor. Accordingly, call gate descriptors, LDT descriptors, and TSS descriptors may coexist in a table with compatibility mode descriptors (or standard mode descriptors) which are of a different size, without redefining the size of the table entries or how the table is managed for descriptors which occupy one entry. Furthermore, since the second portion of the call gate descriptor, the LDT descriptor, and the TSS descriptor may be accessed as a segment descriptor, the portion of the descriptor which would be the type field of a descriptor in the second portion is set to an invalid type when the descriptor is stored into the descriptor table, as shown below in FIG. 6. Alternatively, processor 10 may read two consecutive entries from a descriptor table each time a descriptor table read is performed, and the second entry may be used if the first entry is a call gate, LDT descriptor type, or TSS descriptor type.

It is noted that code operating in any operating mode (32/64 mode, 32 bit compatibility mode, or 16 bits compatibility mode) may reference a call gate descriptor when the LMA bit is set. Thus, a 32 or 16 bits application may call an operating system routine even if the address of the routine is outside the 32 bit or 16 bits address space using the call gate mechanism. Additionally, a call gate descriptor may reference a code segment having any operating mode. The operating system may ensure that the most significant 32 bits of the offset in the call gate are zero (for a 32 bit target segment) or the most significant 48 bits of the offset in the call gate are zero (for a 16 bits target segment).

Turning now to FIG. 6, a block diagram of one embodiment of a call gate descriptor 120 is shown. Other embodiments are possible and contemplated. Similar to FIGS. 2 and 3, the most significant bytes are illustrated above the least significant bytes. The most significant bit of each group of four bytes is illustrated as bit 31 and the least significant bit is illustrated as bit 0. Short vertical lines within the four bytes delimit each bit, and the long vertical lines delimit a bit but also delimit a field. As mentioned above, a call gate descriptor occupies two entries in a descriptor table. The horizontal dashed line in FIG. 6 divides call gate descriptor 120 into an upper portion (above the line) and a lower portion (below the line). The lower portion is stored in the entry indexed by the call gate's segment selector, and the upper portion is stored in the next succeeding entry.

Call gate descriptor 120 includes a target segment selector (field 122), an offset (fields 124A, 124B, and 124C), a present (P) bit 126, a descriptor privilege level (DPL) 128, a type field 130, and a pseudo-type field 132. The P bit is similar to P bit 48 described above. The target segment selector identifies an entry within one of the descriptor tables at which the target segment descriptor (having the greater privilege level) is stored. The offset identifies the address at which code fetching is to begin. In 32/64 mode, since the code segment has no base address and flat linear addressing is used, the offset is the address at which code fetching begins. In other modes, the offset is added to the segment base defined by the target segment descriptor to generate the address at which code fetching begins. As mentioned above, the offset may comprise 64 bits in the present embodiment.

DPL 128 stores the minimum privilege level of the calling routine must have (both in the current privilege level and the requested privilege level) which may successfully pass through the call gate and execute the called routine at the privilege level specified in the target segment descriptor.

Type field 130 is coded to a call gate descriptor type. In one embodiment, this type is coded as the 32 bit call gate type defined in the x86 architecture. Alternatively, other encodings may be used. Finally, pseudo-type field 132 is coded to an invalid type (e.g. zero) to ensure that if a segment selector identifying the segment table entry storing the upper half of call gate descriptor 120 is presented, then an exception will be signalled by processor 10.

Figure 7:
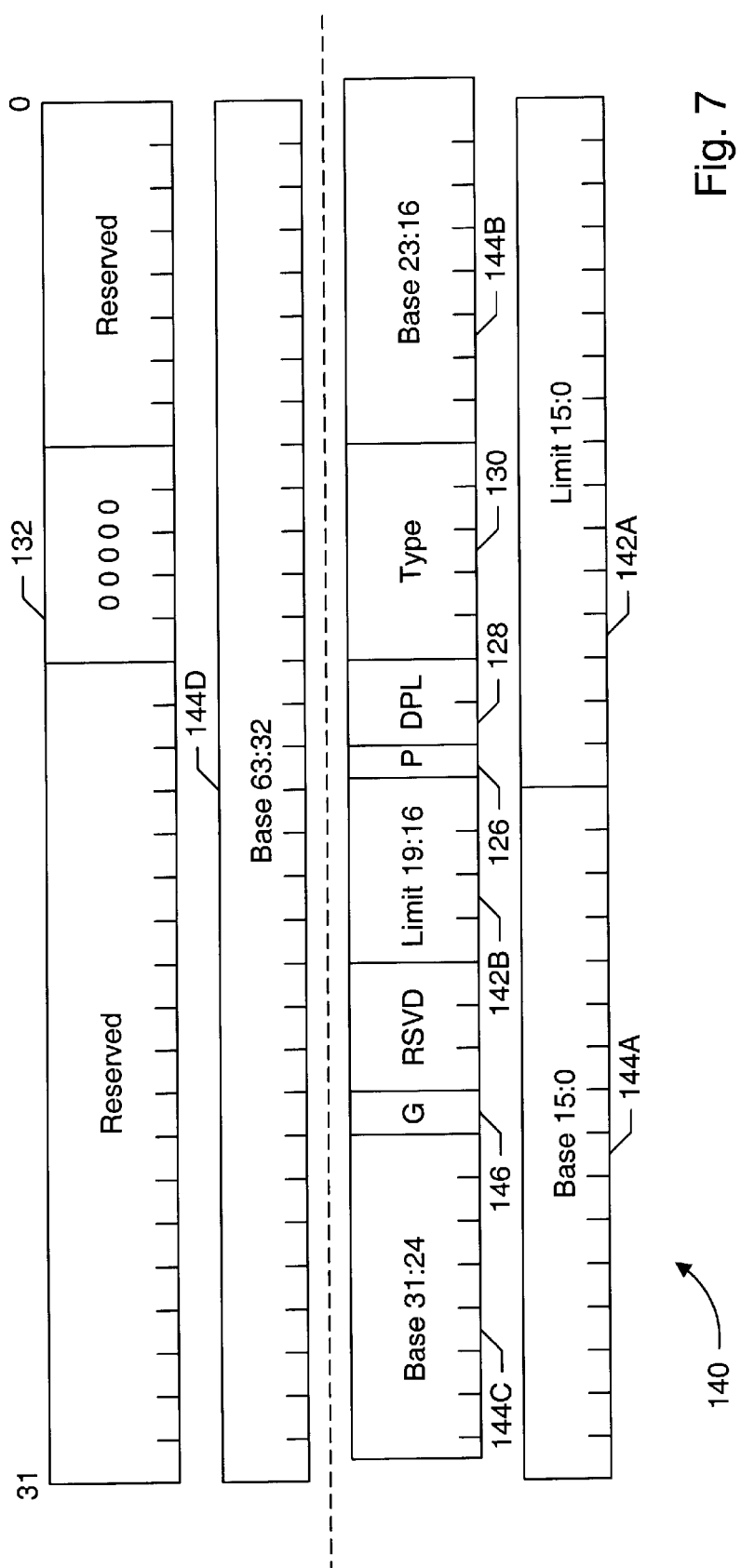
FIG. 7 is a block diagram of one embodiment of a local descriptor table (LDT) or task state segment (TSS) descriptor.

Turning next to FIG. 7, a block diagram of one embodiment of a TSS or LDT descriptor 140 is shown. Other embodiments are possible and contemplated. Similar to FIGS. 2 and 3, the most significant bytes are illustrated above the least significant bytes. The most significant bit of each group of four bytes is illustrated as bit 31 and the least significant bit is illustrated as bit 0. Short vertical lines within the four bytes delimit each bit, and the long vertical lines delimit a bit but also delimit a field. As mentioned above, an LDT or TSS descriptor occupies two entries in a descriptor table. The horizontal dashed line in FIG. 7 divides descriptor 140 into an upper portion (above the line) and a lower portion (below the line). The lower portion is stored in the entry indexed by the descriptor's segment selector, and the upper portion is stored in the next succeeding entry.

Descriptor 140 includes a limit (fields 142A and 142B) and a base address (fields 144A, 144B, 144C and 144D). The base address is the base address of the local descriptor table 82 if descriptor 140 is an LDT descriptor, or is the base address of the task state segment if descriptor 140 is a TSS descriptor. The limit is the limit of the local descriptor table 82 or the task state segment. Additionally, descriptor 140 includes type field 130 (coded to an LDT type or a TSS type), DPL field 128, a P bit 126, and a pseudo-type field 132 similar to the descriptor 120 shown in FIG. 6. Finally, descriptor 140 includes a G bit 146 which may be similar to the G bit shown in FIG. 3.

Figure 8:
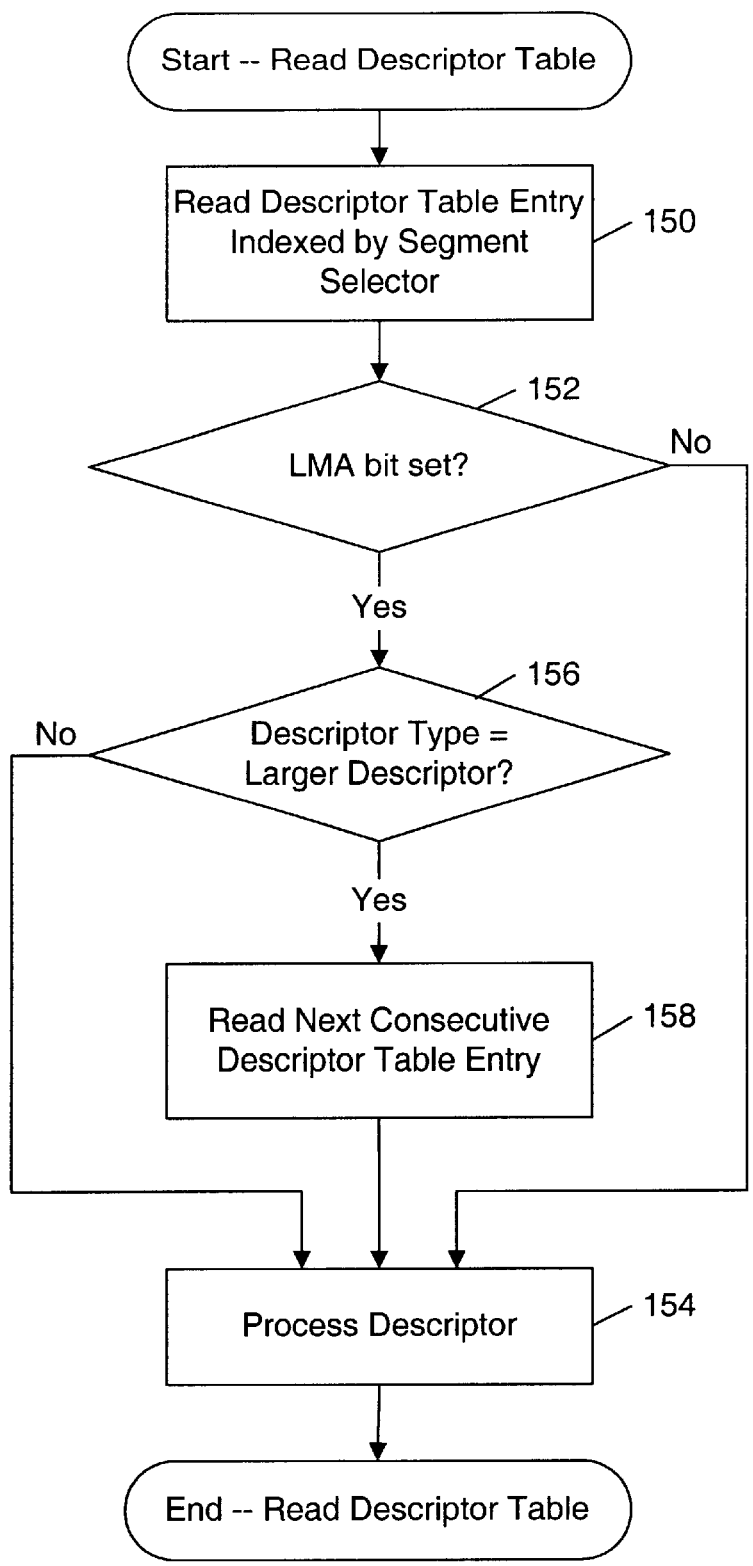
FIG. 8 is a flowchart illustrating one embodiment of reading a descriptor table.

Turning next to FIG. 8, a flowchart is shown illustrating operation of one embodiment of processor 10 when reading a segment descriptor from a descriptor table. Other embodiments are possible and contemplated. While the blocks shown in FIG. 8 are illustrated in a particular order for ease of understanding, any suitable order may be used. Furthermore, blocks may be performed in parallel by combinatorial logic circuitry within processor 10.

Processor 10 reads the segment descriptor table entry indexed by the segment selector (block 150). The segment descriptor table to be read may be included in the segment selector as well (the table indicator bit). Additionally, processor 10 determines if the LMA bit is set (decision block 152). If the LMA bit is not set, the segment descriptor read during block 150 is processed (block 154). On the other hand, if the LMA bit is set, processor 10 examines the type field to determine if the descriptor is one of the larger descriptors (e.g. the call gate, TSS, or LDT descriptor types in the present embodiment) in decision block 156. If the descriptor is one of the smaller descriptors, the descriptor is processed (block 154). If the descriptor is one of the larger descriptors, the next consecutive entry to the indexed descriptor table entry is read (block 158). The larger descriptor (read via blocks 150 and 158) is then processed (block 154).

As mentioned above, any order of the blocks shown in FIG. 8 may be used. Specifically, the reading of the descriptor table entry indexed by the segment selector (block 150) may be performed after checking the LMA bit (decision block 152) and after determining if the descriptor type is a larger descriptor type (decision block 156). Furthermore, the order of checking the LMA bit (decision block 152) and determining if the descriptor type is a larger descriptor type (decision block 156) may be reversed. In one particular implementation, the flowchart of FIG. 8 may be implemented as part of a microcode routine or routines used to read the segment descriptor table. Particularly, an implementation may include separate microcode routines for each descriptor type. In such an implementation, whether or not the descriptor is a larger descriptor type (decision block 156) may be inherent in the routine being executed, and thus may not require an explicit check. Thus, the routines corresponding to larger descriptor types may merely determine if the LMA bit is set (decision block 152) to determine whether or not to read the next consecutive descriptor table entry (block 158), and the routines corresponding to descriptor types which are not larger in 32/64 mode may not require the LMA bit check (decision block 152).

It is noted that processor 10 may also store each segment descriptor in the segment descriptor table, in response to an operating system routine. The operating system routine may include instructions to create the segment descriptors and to store them in the segment descriptor table.

Software Embodiments

While the above description may generally have described a processor which may directly support, in hardware, the processor architecture having the features described above, it is contemplated that other processor embodiments may not directly implement the processor architecture. Instead, such embodiments may directly implement a different processor architecture (referred to below as a native processor architecture, which may define a native instruction set including native instructions). Any native processor architecture may be used. For example, the MIPS™, Power PC™, Alpha™, Sparc™, ARM™, etc. architectures may be used. The processor architecture may be implemented in software executing on the native processor architecture in a variety of fashions, using any native processor architecture such as, for example, the Crusoe products of Transmeta Corporation.

Generally, a processor embodiment implementing a native processor architecture different than the processor architecture described above (referred to below as the non-native processor architecture) may support the non-native processor architecture in a variety of fashions. For example, such a processor embodiment may execute interpreter software which reads each non-native instruction in a non-native code sequence as data, and executes various software routines which emulate the defined operation of the non-native instruction as defined in the non-native processor architecture. Alternatively, translator software may be executed. The translator software may translate the non-native instructions in the code sequence to an equivalent set of native instructions defined by the native instruction set architecture. The native code sequence may be stored in memory, and may be executed instead of the corresponding non-native code sequence. In yet another alternative, a mixture of interpretation and translation may be used. For example, the code sequence may be interpreted, but the interpreter may also generate statistics about which parts of the code sequence are being most frequently executed. The most frequently executed portions may then be translated to native code sequences.

In any of the above methods, the architected state defined by the non-native processor architecture may be maintained by the combination of the processor and the software (interpreter or translator) in a variety of fashions. For example, the non-native architected state may be mapped to memory locations in a memory addressable by the processor, to general registers defined by the native processor architecture (by software convention, either in the interpreter or in the translator), or the processor may directly support the non-native architected state by defining registers or other storage hardware within the processor that corresponds to the non-native architected state. The non-native architected state may be stored using any combination of the above methods, as desired.

Generally, the architected state includes any state defined to exist by the architecture. For example, in the above described embodiment, the non-native architected state may include general registers (e.g. RAX, RBX, etc.), segment registers, control registers, other registers such as the model specific registers (MSRs), etc. Additionally, the architected state may include data structures defined for the operating system to create, such as the descriptor tables, page tables, task state segments, etc.

Figure 9:
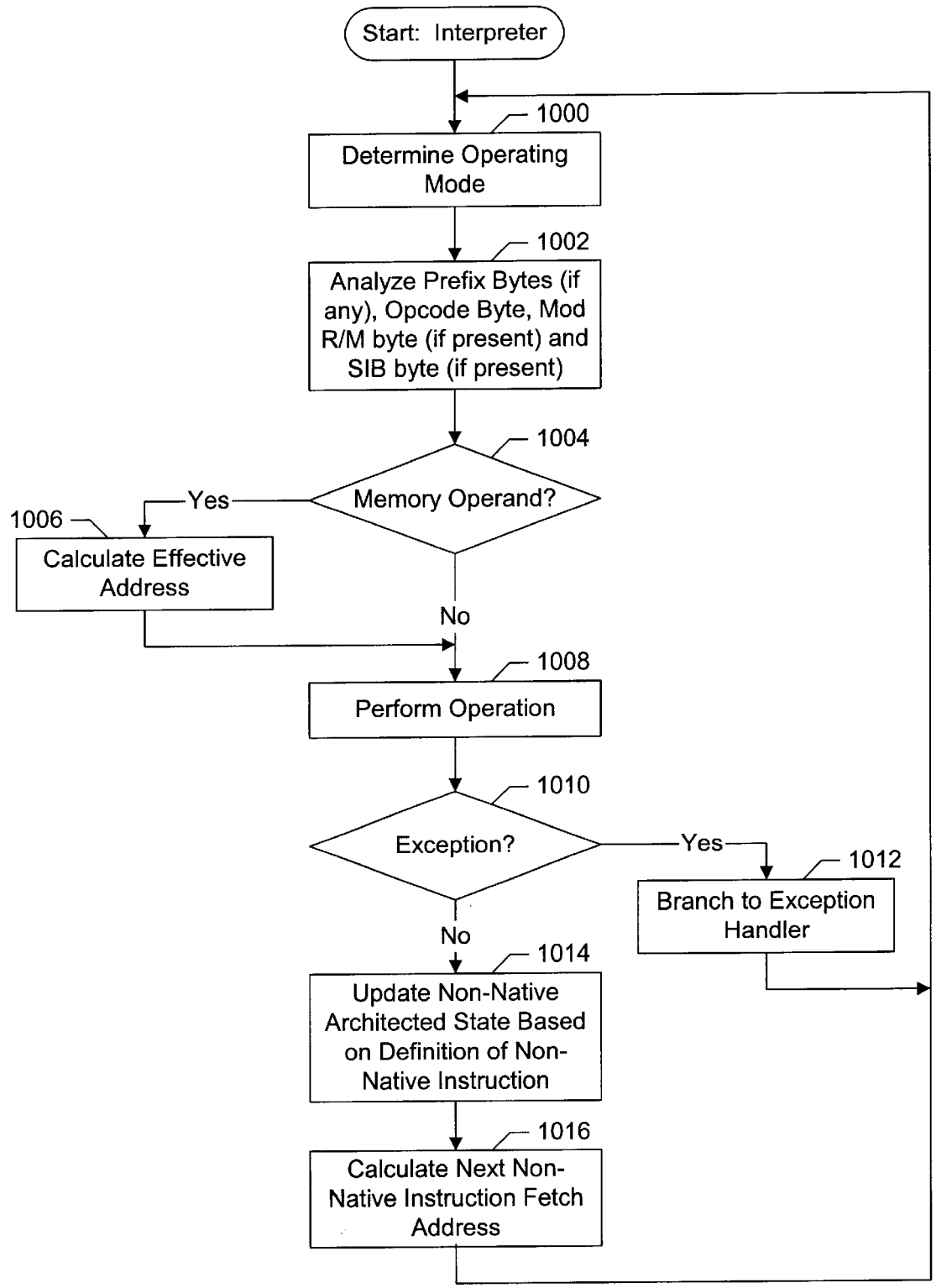
FIG. 9 is a flowchart illustrating one embodiment of an interpreter.

Turning to FIG. 9, a flowchart illustrating an exemplary interpreter which may be used to interpret non-native instructions is shown. Other embodiments are possible and contemplated. While the blocks shown are illustrated in a particular order for ease of understanding, any suitable order may be used. Furthermore, blocks may be performed in parallel, as desired.

The blocks shown in FIG. 9 illustrate the emulation of one non-native instruction. Generally, the interpreter may execute the blocks shown in FIG. 9 for each non-native instruction to be executed according to the non-native code sequence to be executed.

The interpreter may determine the operating mode for the non-native instruction (block 1000). As described above, the operating mode may be determined from the LMA bit in control register 26 and the L bit and D bit from the code segment descriptor indicated by the CS segment register. The operating mode may be determined anew from the LMA, L bit, and D bit for each non-native instruction, or the resulting operating mode may be stored in a temporary register for access by the interpreter for each non-native instruction. If the resulting operating mode is stored, the interpreter may update the stored operating mode if an instruction modifies the CS segment register or interrupt or exception handling causes the operating mode to change. As mentioned above, the CS segment register and the control register(s) (which are part of the non-native architected state) may actually be memory locations, general registers, or special purpose registers, or any combination thereof.

The interpreter may read the current non-native instruction from memory, and may analyze the non-native instruction to determine the operations to be taken to emulate the non-native instruction. The interpreter may read the non-native instruction one byte at a time, or may read a suitable set of consecutive bytes and process the bytes. For example, a native processor architecture in which operands are 32 bit may read 32 bits (4 bytes) of the non-native instruction at a time, and then may process the four bytes before reading any additional bytes.

Generally, the interpreter software may decode the non-native instruction in a manner analogous to processor 10 decoding the instruction in hardware. Thus, for the illustrated non-native processor architecture, which is compatible with the x86 processor architecture, the analyzing of the non-native instruction includes analyzing any prefix bytes which may precede the opcode byte, analyzing the opcode byte, analyzing the addressing mode (Mod R/M) byte (if present) (block 1002), and analyzing the scale-index-base (SIB) byte (if present). Prefix bytes may override the operating mode, and may also include register specifier bits (e.g. the REX prefix byte). The opcode byte specifies the operation to be performed, and in some cases may include a register specifier or may implicitly specify an operand (e.g. the stack or the stack pointer). The Mod R/M byte specifies operands (including any displacement operands which may follow the Mod R/M byte or the SIB byte, if the SIB byte is present) and may include register specifiers. Finally, the SIB byte may include register specifiers. From the information gained from analyzing the non-native instruction, the interpreter has the information to emulate the non-native instruction (including operating mode for the non-native instruction, which specifies the operand size and address size of the non-native instruction, operands, the operation to be performed, etc.).

If the non-native instruction includes a memory operand (decision block 1004), the interpreter may calculate the effective address of the instruction (block 1006). If the non-native instruction has a memory operand, some of the operands identified in block 1002 may be address operands used to generate the effective address. Thus, the interpreter may read the address operands from the non-native architected state and may add them to generate an effective address. The size of the effective address may be determined by the address size for the instruction, as determined at blocks 1000 and 1002. It is noted that the native processor architecture may support an address size which is less than the address size supported by the non-native processor architecture. For example, in one exemplary embodiment described above, the virtual address size may be 48 bits in 32/64 mode. The native processor may, for example, support a virtual address size of 32 bits. In such an embodiment, block 1006 may represent a series of calculations in which the least significant bits (e.g. 32 bits) of the virtual address may be calculated, and any carry from the least significant bits may be carried into a calculation of the most significant bits of the virtual address.

The interpreter may then perform the operation specified by the non-native instruction (block 1008). If the non-native instruction includes a memory operand as a source operand, the interpreter may read the memory operand from the effective address calculated at block 1006. Other operands may be read from the non-native architected state. The operation may include an arithmetic operation, a logical operation, a shift, a move to another storage location, etc. The native processor architecture may support an operand size smaller than the operand size of the instruction. In such cases, performing the operation may include multiple calculations on portions of the operand to calculate the result.

The interpreter determines if the non-native instruction resulted in an exception (decision block 1010). Generally, exceptions may occur throughout the execution of the operations specified by the non-native instruction. For example, accessing a source memory operand may result in a page fault before any of the actual instruction operation is performed. During the operations, various architecturally-defined exceptions may also occur. The interpreter may interrupt processing of the non-native instruction upon detecting an exception, and may branch to exception handler instructions (block 1012). The exception handler may be native code or non-native code or a combination thereof, as desired. If the non-native processor architecture specifies the update of any architected state when an exception is taken (e.g. various control registers may store the address of the exception causing instruction, the exception reason, etc.), the interpreter may update the non-native architected state as defined.

It is noted that the interpreter software is executing on the native processor, and thus is subject to experiencing exceptions as defined in the native processor architecture. These exceptions may generally be different from the exceptions detected by the interpreter software, which are exceptions experienced by the non-native code being interpreted according to the non-native processor architecture.

If no exception occurs during emulation of the non-native instruction, the interpreter may update the non-native architected state according to the definition of the non-native instruction (block 1014). Finally, the interpreter may calculate the next non-native instruction fetch address to fetch the next instruction (block 1016). The next fetch address may be sequential to the current non-native instruction, or may be a different address (e.g. if the current non-native instruction is a taken branch, the next fetch address may be the target address of the branch instruction).

It is noted that the interpreter may operate in protected mode, using virtual addresses. In other words, the effective address calculated at block 1006 may be a virtual address which is translated by the translation mechanism specified by the non-native processor architecture to a physical address. The processor may include a translation lookaside buffer (TLB) used to cache translations. The processor may either support reload of the TLB from the non-native translation tables (page tables), or may take an exception on a TLB miss to allow software reload of the TLB.

Generally, the interpreter may perform the flowchart of FIG. 8 at any suitable point in the processing of instructions, e.g. blocks 1006 or 1008, depending on the instruction.

Figure 10:
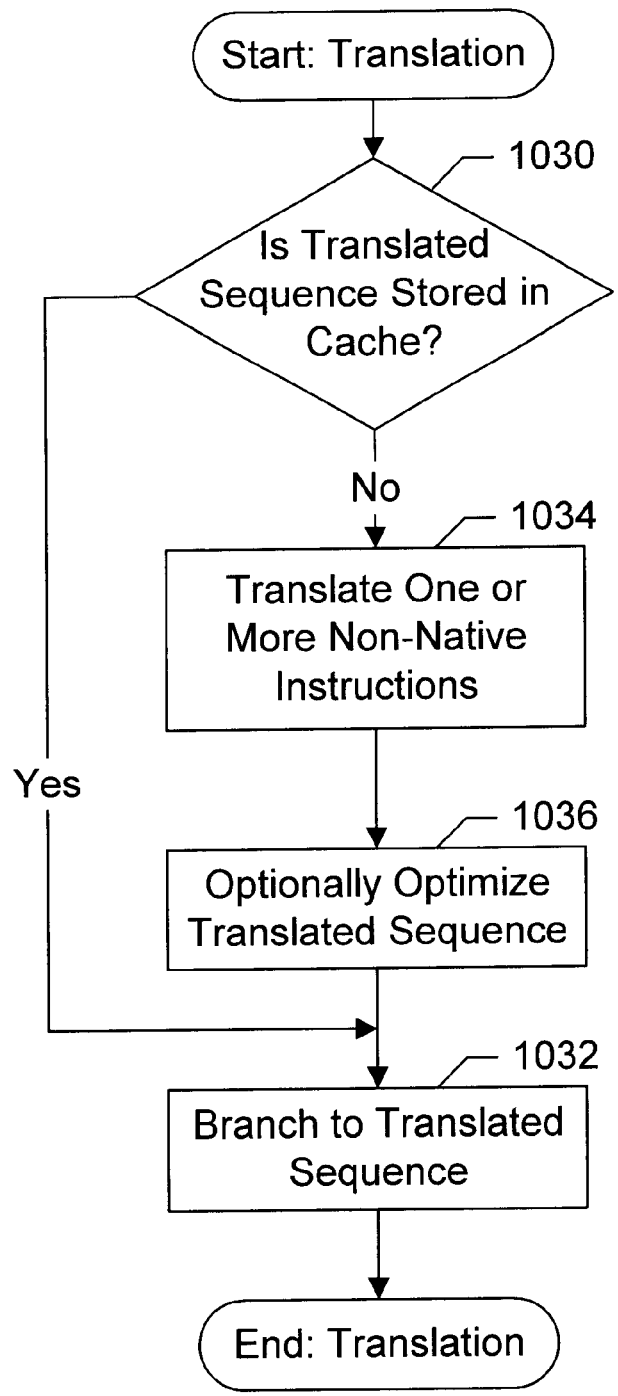
FIG. 10 is a flowchart illustrating one embodiment of a translator.

Turning to FIG. 10, a flowchart illustrating an exemplary translator which may be used to translate non-native instructions in the non-native processor architecture to native instructions in the native processor architecture. Other embodiments are possible and contemplated. While the blocks shown are illustrated in a particular order for ease of understanding, any suitable order may be used. Furthermore, blocks may be performed in parallel, as desired.

The blocks shown in FIG. 10 illustrate the translation of one non-native code sequence responsive to a fetch address for the first instruction in the non-native code sequence. The code translator may translate any number of non-native instructions to produce a translated code sequence having native instructions. For example, the translator may translate from the initial non-native instruction to a basic block boundary (i.e. a branch instruction). Alternatively, the translator may speculatively translate two or more basic blocks or may translate up to a maximum number of non-native or resulting native instructions, if desired.

Generally, the translator may maintain a translation cache which stores translated code sequences previously produced by the translator. The translation cache may identify translated code sequences by the fetch address of the first non-native instruction in the corresponding non-native code sequences. Thus, the translator may determine if a translated code sequence corresponding to the fetch address is stored in the translation cache (decision block 1030). If there is a translated code sequence in the translation cache, the translator may cause the processor to branch to that translated code sequence (block 1032). On the other hand, if there is no translated code sequence, the translator may translate one or more non-native instructions from the non-native code sequence into native instructions in a translated code sequence (block 1034).

Generally, the translator may translate each non-native instruction into one or more native instructions which, when executed, may perform the same operation on the non-native architected state that the non-native instruction would have performed. The translator may generally perform the same decoding of instructions as is performed by the interpreter (block 1002 in FIG. 9) to determine what operations may need to be performed. For example, if the native processor architecture is a load/store architecture in which memory operands are accessed using explicit load/store instructions and other instructions use only register operands, load and store instructions may be used to access the memory operands and other instructions may be used to perform the explicit operation of a non-native instruction having a memory operand. The translated instructions may make use of temporary registers to hold intermediate values corresponding to the execution of the non-native instruction. Additionally, the translated instructions may access the non-native architected state to retrieve operands and may update the non-native architected state with the final results of the non-native instruction. Generally, the native instructions corresponding to the non-native instruction may perform all of the operations defined for the instruction (e.g. blocks 1006, 1008, 1010, 1014, and 1016 in FIG. 9).

Once the translator has determined to terminate translation and save the translated sequence for execution, the translator may optionally optimize the translated code sequence (block 1036). The optimizations may include reordering the translated instructions for quicker execution, eliminating redundancies (e.g. redundant memory references, which may occur if multiple non-native instructions in the source code sequence accessed the same memory location), etc. Any suitable set of optimizations may be used. The resulting translated code sequence may then be stored into the translation cache. Additionally, the processor may branch to the translated code sequence and execute the sequence (block 1032).

It is noted that, while the above description may refer to accessing and/or updating a non-native architected state, including various registers, the non-native architected state may be stored in any suitable fashion. For example, architected registers may actually be stored in memory locations, as highlighted above. The mapping of architected registers from the non-native processor architecture to memory locations may be used in either of the interpreter or the translator embodiments, or combinations thereof, to locate the non-native architected state used during execution of the non-native instruction or affected by the execution of the non-native instruction. Thus, instructions which access the non-native architected state may perform memory reads/writes or register reads/writes, as the case may be.

Figure 11:
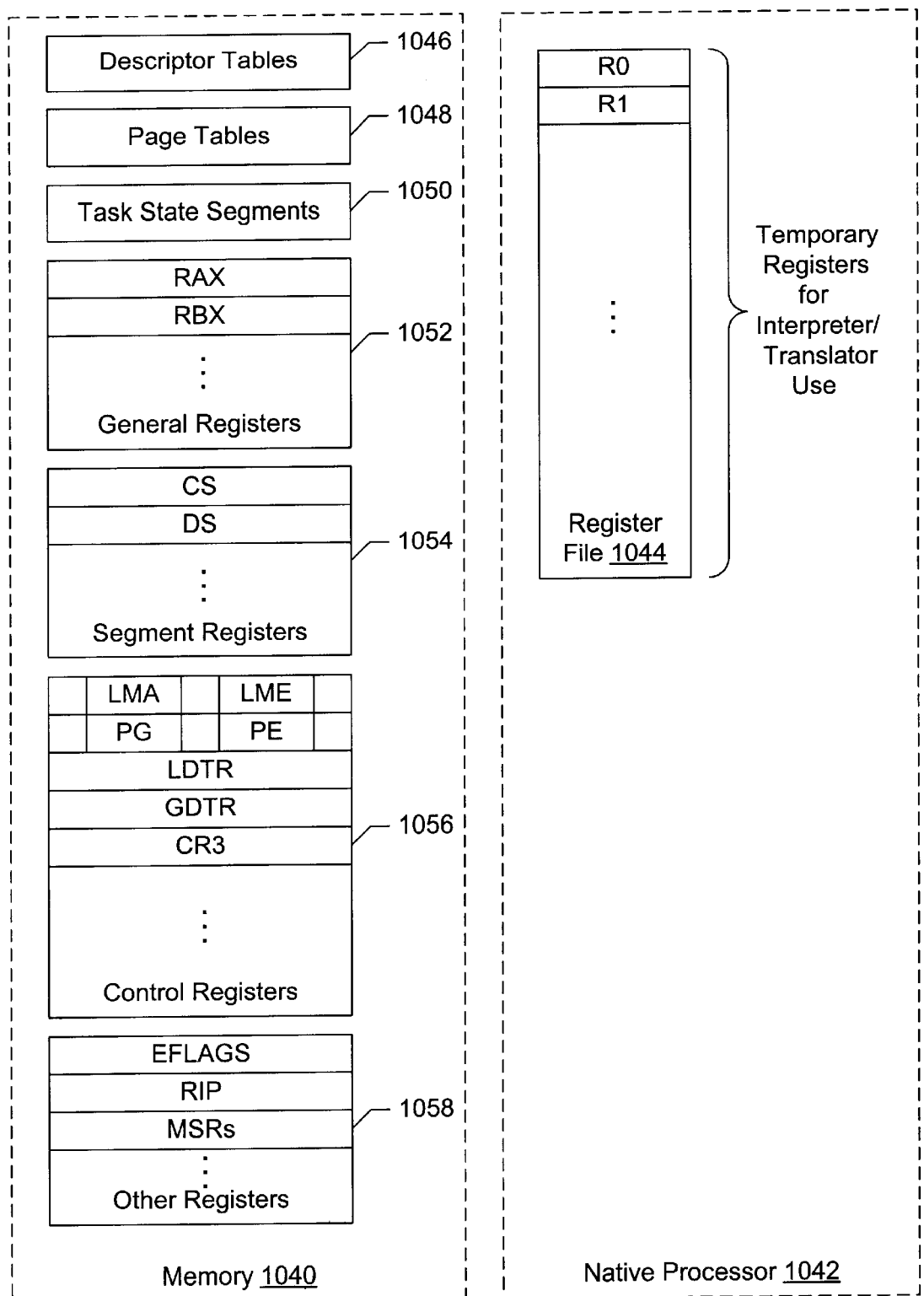
FIG. 11 is a block diagram illustrating one embodiment of mapping a non-native architected state.

Turning next to FIG. 11, a block diagram is shown illustrating one exemplary mapping of a non-native architected state to either memory locations in a memory 1040 or to processor resources in a native processor 1042. Native processor 1042 includes a register file 1044 including the architected general registers of the native processor architecture. Any number of registers may be provided.

In the embodiment of FIG. 11, all of the non-native architected state is mapped to memory 1040. For example, descriptor tables 1046 (which may include global descriptor table 80, local descriptor table 82, and an interrupt descriptor table), page tables 1048 (which store virtual to physical address translations), task state segments 1050, general registers 1052, segment registers 1054, control registers 1056, and other registers 1058 may represent the non-native architected state.

Thus, in the embodiment of FIG. 11, to access any non-native architected state, a memory access may be performed. For example, if a non-native instruction has one of the general registers as an operand, the interpreter or translated native instruction performs a memory access to the memory location mapped to that general register to access or update that general register. The registers in register file 1044 may be used by the interpreter or translator as temporary registers to hold intermediate results or for another local interpreter/translator state.

General registers 1052 may include integer general registers (e.g. RAX, RBX, etc. as described above), the additional integer general registers defined by the REX prefix byte, floating point registers, Streaming Single Instruction, Multiple Data (SIMD) Extension (SSE) registers, and the additional SSE registers defined by the REX prefix byte.

Segment registers 1054 may include storage locations corresponding to the segment registers 24 shown in FIG. 1 above.

Control registers 1056 may include storage locations corresponding to various control registers defined in the non-native processor architecture. For example, control registers storing the LMA, LME, PG and PE bits, as well as the LDTR and GDTR registers and the CR3 register (which stores the base address of the page tables 1048) are shown. Other control registers may be included as well.

Other registers 1058 include any remaining architected registers. For example, the EFLAGS register (which stores condition code information), the instruction pointer (RIP) register (which stores the address of the instruction to be executed), and the model specific registers (MSRs) may be included in other registers 1058.

Figure 12:
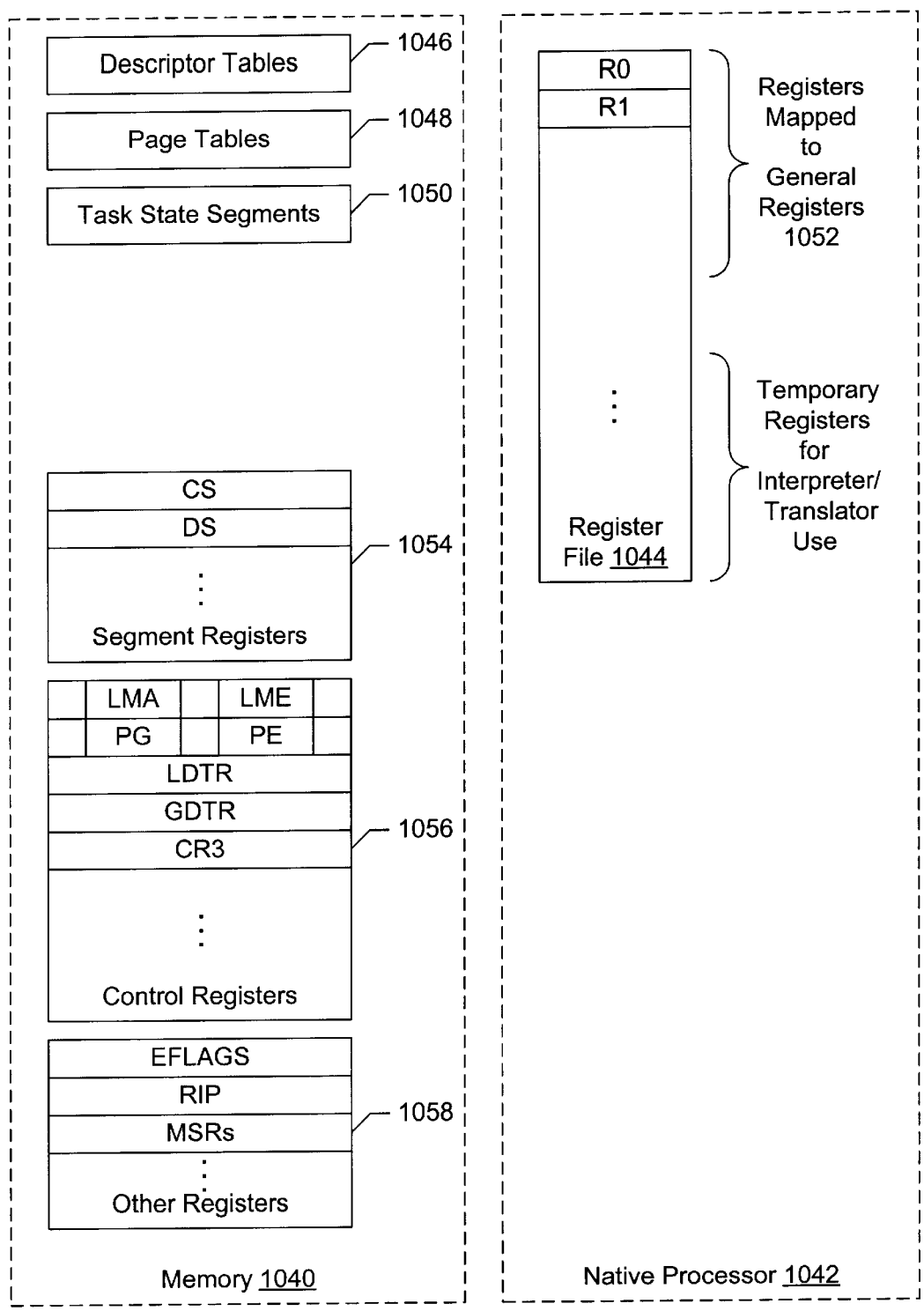
FIG. 12 is a block diagram illustrating a second embodiment of mapping a non-native architected state.

While the example of FIG. 11 maps all of the non-native architected state to memory 1040, other embodiments may implement other mappings. In FIG. 12, for example, some of the general registers in register file 1044 are mapped to the general registers 1052. Accordingly, if a non-native instruction has a general register as an operand, the interpreter accesses the corresponding register in register file 1044. Similarly, the translator generates a translated instruction having the corresponding register in register file 1044 as an operand. Other architected states may still be accessed via memory operations in the embodiment of FIG. 12. Other registers in register file 1044 which are not assigned to the non-native architected state may again be used as temporary registers for interpreter or translator use, as described above.

While the embodiment of FIG. 12 illustrates mapping the general registers 1052 to registers in register file 1044, any other non-native architected state may be mapped to registers in register file 1044. For example, any of segment registers 1054, control registers 1056, or other registers 1058 (or portions of any of these registers) may be mapped to register file 1044, as desired.

Figure 13:
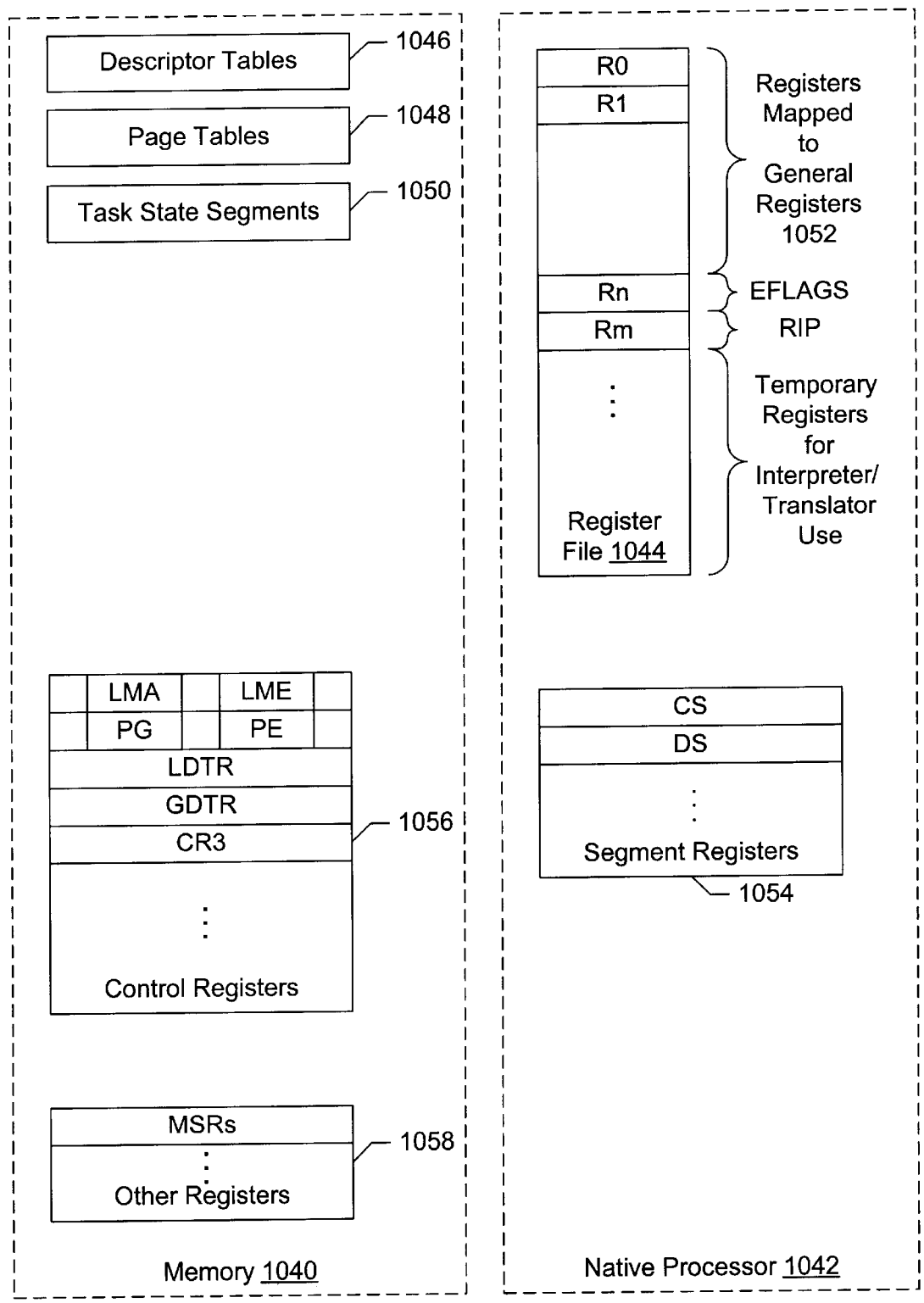
FIG. 13 is a block diagram illustrating a third embodiment of mapping a non-native architected state.

FIG. 13 illustrates another example in which the general registers 1052 and the EFLAGS and RIP registers are mapped to registers in register file 1044. Additionally, in the example of FIG. 13, the segment registers 1054 are implemented in hardware in processor 1042. More specifically, processor 1042 may not only implement storage for segment registers 1054, but may also include logic to determine the operating mode for instructions based on the information in the segment registers. Furthermore, for compatibility modes, the logic may include limit checks and attribute checks to ensure that accesses to the segment attempted by the non-native instructions (or the non-native instructions in the interpreter or the translated code sequence which correspond to the non-native instructions) are permitted.

Similarly, other embodiments may implement various control registers 1056 or other registers 1058 in hardware, including corresponding logic to act on the contents of the registers as defined in the non-native architecture. Generally, various embodiments of processor 1042 may implement any non-native architected state in hardware. Certain architected states may generally be implemented in memory since the non-native processor architecture defines the state to be in memory (e.g. descriptor tables 1046, pages tables 1048, and task state segments 1050). Such a memory-based architected state may be cached in caches within processor 1042 (e.g. TLBs for page table information, hidden segment register portions for segment descriptor information, etc.).

As the above discussion illustrates, the non-native architected state may be stored in any suitable storage location. Generally, a storage location is a location capable of storing a value. Suitable storage locations may include, in various embodiments, a memory location, a general register mapped to the non-native architected state, or a special purpose register (which may include additional hardware to interpret the contents of the register), depending upon the embodiment. Additionally, suitable storage locations could include a scratch pad random access memory (RAM) (such as a portion of a cache predetermined to be used as scratch pad RAM).

Figure 14:
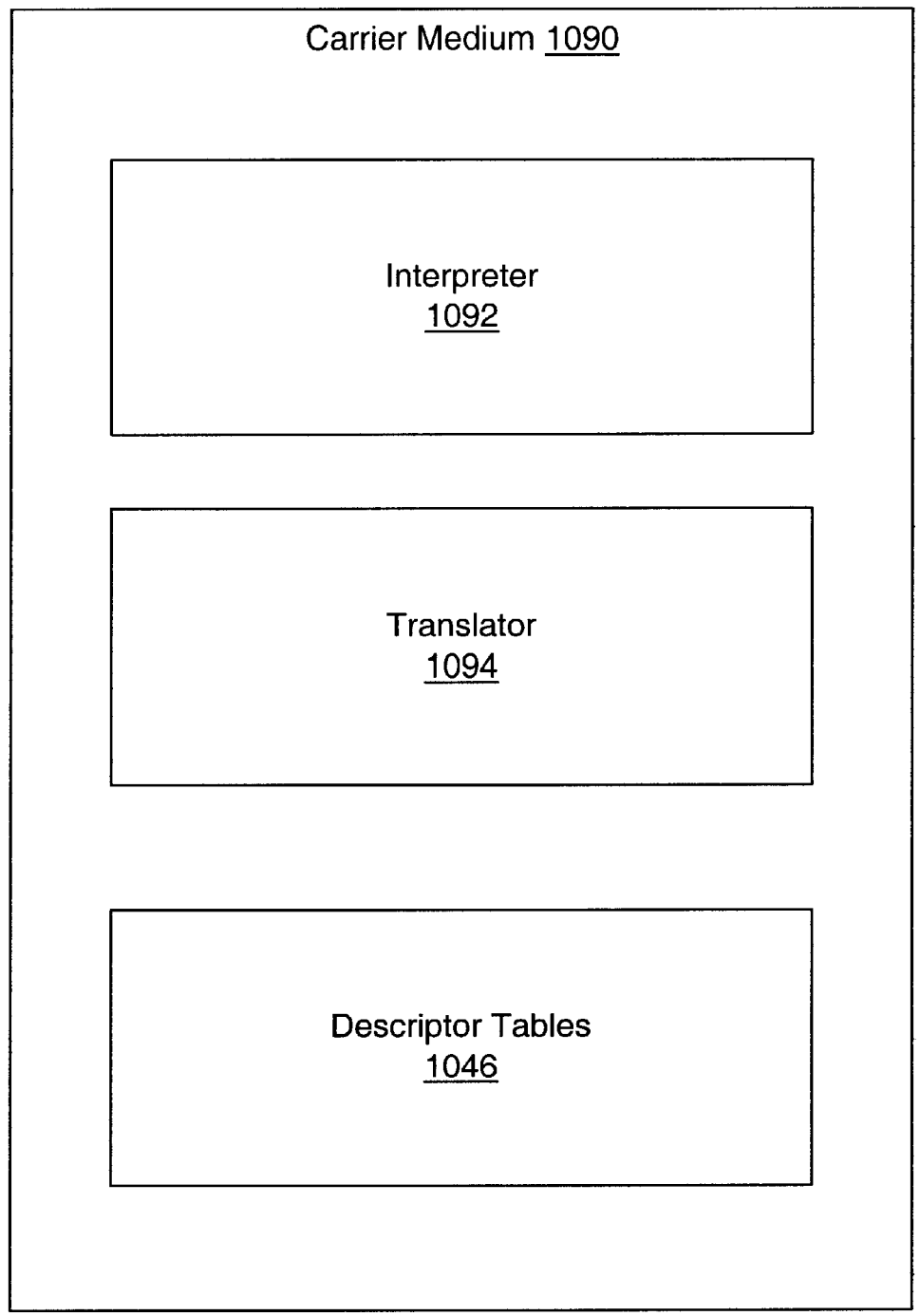
FIG. 14 is a block diagram of one embodiment of a carrier medium.

FIG. 14 is a block diagram of one embodiment of a carrier medium 1090. Other embodiments are possible and contemplated. In the embodiment of FIG. 14, carrier medium 1090 stores an interpreter program 1092, a translator program 1094, and descriptor tables 1046.

Generally speaking, a carrier medium may include storage media such as magnetic or optical media, e.g., disk or compact disc-read only memory (CD-ROM), volatile or non-volatile memory media such as RAM (e.g. synchronous dynamic RAM (SDRAM), Rambus dynamic RAM (RDRAM), static RAM (SRAM), etc.), read-only memory (ROM), etc., as well as transmission media or signals such as electrical, electromagnetic, or digital signals, conveyed via a communication medium such as a network and/or a wireless link. Carrier medium 1090 may thus be coupled to a computer system including processor 1042, may be part of a computer system including processor 1042, or may be a communication medium on which the computer system is capable of communicating. Computer systems including processor 1042 may be of any construction. For example, computer systems similar to those shown in FIGS. 15 and 16 may be suitable.

Interpreter program 1092 may operate according to the flowchart of FIG. 9. Translator program 1094 may operate according to the flowchart of FIG. 10. Generally, interpreter program 1092 and translator program 1094 may each comprise code sequences including native instructions.

Computer Systems

Figure 15:
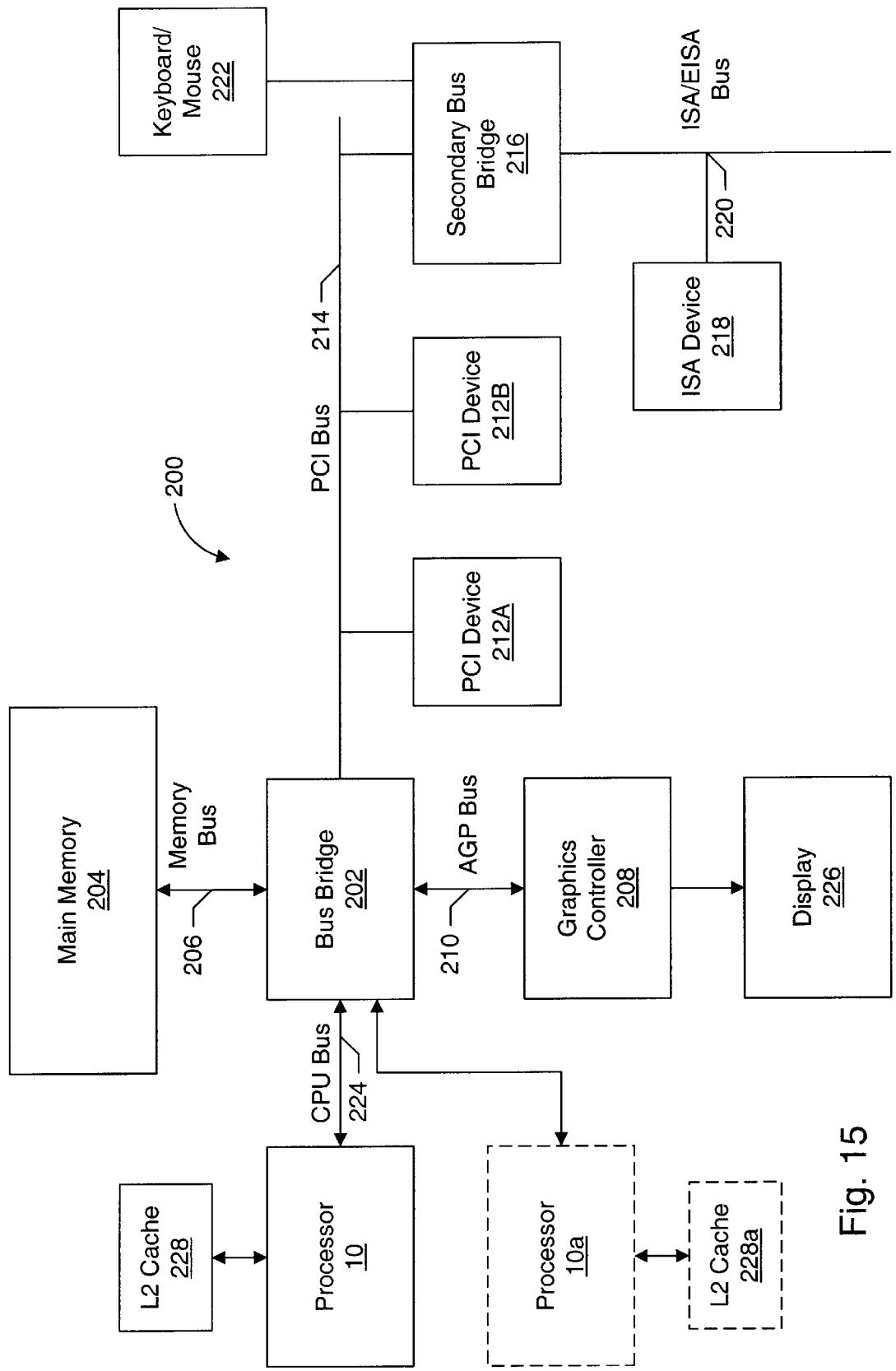
FIG. 15 is a block diagram of one embodiment of a computer system including the processor shown in FIG. 1.

Turning now to FIG. 15, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an accelerated graphics port (AGP) bus 210. Finally, a plurality of peripheral component interconnect (PCI) devices 212A–212B are coupled to bus bridge 202 through a PCI bus 214. A secondary bus bridge 216 may further be provided to accommodate an electrical interface to one or more extended industry standard architecture (EISA) or industry standard architecture (ISA) devices 218 through an EISA/ISA bus 220. Processor 10 is coupled to bus bridge 202 through a central processing unit (CPU) bus 224 and to an optional level 2 (L2) cache 228. Together, CPU bus 224 and the interface to L2 cache 228 may comprise an external interface to which external interface unit 18 (FIG. 1) may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/ output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises Dynamic Random Access Memory (DRAM). For example, a plurality of banks of Synchronous DRAM (SDRAM) or Rambus DRAM (RDRAM) may be suitable.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as general purpose interface bus (GPIB) or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 15) or may share CPU bus 224 with processor 10. Furthermore, processor 10a may be coupled to an optional L2 cache 228a similar to L2 cache 228.

Figure 16:
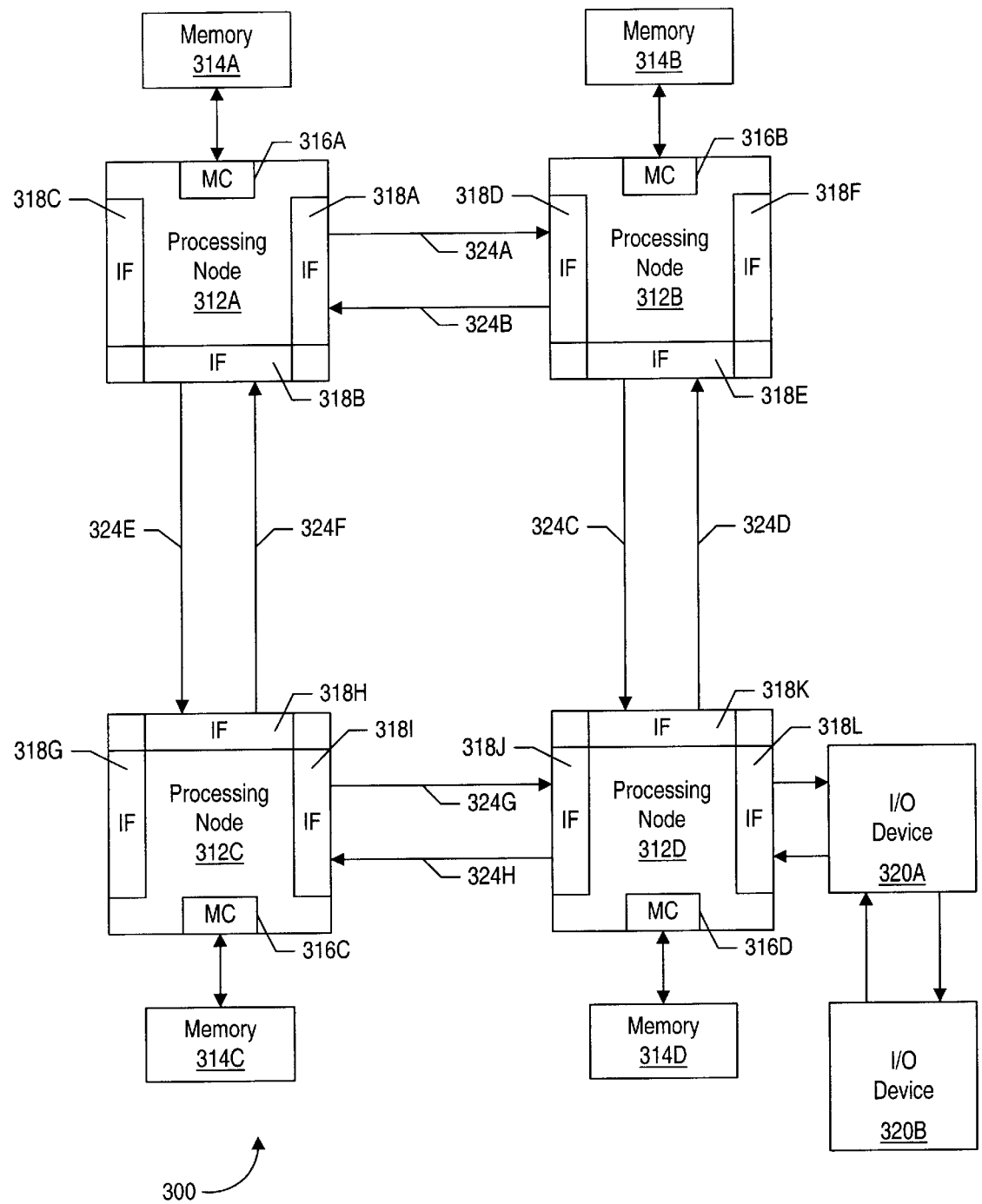
FIG. 16 is a block diagram of another embodiment of a computer system including the processor shown in FIG. 1.

Turning now to FIG. 16, another embodiment of a computer system 300 is shown. Other embodiments are possible and contemplated. In the embodiment of FIG. 16, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 16. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 16. Any suitable routing algorithm may be used. Other embodiments of computer system 300 may include more or fewer processing nodes then the embodiment shown in FIG. 16.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 (FIG. 1) may include the interface logic 318 within the node, as well as the memory controller 316.

Memories 314A–314D may comprise any suitable memory devices. For example, a memory 314A–314D may comprise one or more RAMBUS™ DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A memory storing at least one descriptor table, the at least one descriptor table storing at least a first segment descriptor and a second segment descriptor, wherein the second segment descriptor is larger than the first segment descriptor.

2. The memory as recited in claim 1 wherein the at least one segment descriptor table comprises a plurality of entries, and wherein the first segment descriptor occupies one of the plurality of entries, and wherein the second segment descriptor occupies at least two of the plurality of entries.

3. The memory as recited in claim 1 wherein a size of a segment descriptor in the at least one descriptor table is dependent on a type of the segment descriptor.

4. The memory as recited in claim 1 wherein the second segment descriptor is a call gate descriptor.

5. The memory as recited in claim 1 wherein the second segment descriptor is a local descriptor table (LDT) descriptor.

6. The memory as recited in claim 1 wherein the second segment descriptor is a task state segment (TSS) descriptor.

7. An apparatus comprising:
   a processor; and
   a memory coupled to the processor, the memory storing at least one descriptor table, the at least one descriptor table storing at least a first segment descriptor and a second segment descriptor, wherein the second segment descriptor is larger than the first segment descriptor.

8. The apparatus as recited in claim 7 wherein the at least one segment descriptor table comprises a plurality of entries, and wherein the first segment descriptor occupies one of the plurality of entries, and wherein the second segment descriptor occupies at least two of the plurality of entries.

9. The apparatus as recited in claim 7 wherein a size of a segment descriptor in the at least one descriptor table is dependent on a type of the segment descriptor.

10. The apparatus as recited in claim 7 wherein the second segment descriptor is a call gate descriptor.

11. The apparatus as recited in claim 7 wherein the second segment descriptor is a local descriptor table (LDT) descriptor.

12. The apparatus as recited in claim 7 wherein the second segment descriptor is a task state segment (TSS) descriptor.

13. A method comprising:
   storing a first segment descriptor in a segment descriptor table; and
   storing a second segment descriptor in the segment descriptor table, the second segment descriptor being larger than the first segment descriptor.

14. The method as recited in claim 13 wherein the segment descriptor table comprises a plurality of entries, and wherein the first segment descriptor occupies one of the plurality of entries, and wherein the second segment descriptor occupies at least two of the plurality of entries.

15. The method as recited in claim 13 wherein a size of a segment descriptor in the descriptor table is dependent on a type of the segment descriptor.

16. The method as recited in claim 13 wherein the second segment descriptor is a call gate descriptor.

17. The method as recited in claim 13 wherein the second segment descriptor is a local descriptor table (LDT) descriptor.

18. The method as recited in claim 13 wherein the second segment descriptor is a task state segment (TSS) descriptor.

19. A processor comprising a memory management unit, wherein the memory management unit, in response to a first segment selector that identifies a first segment descriptor in a segment descriptor table, is configured to read the first segment descriptor from the segment descriptor table, and wherein the memory management unit, in response to a second segment selector that identifies a second segment descriptor in the segment descriptor table, is configured to read the second segment descriptor from the segment descriptor table, wherein the second segment descriptor is larger than the first segment descriptor.

20. The processor as recited in claim 19 wherein the second segment descriptor occupies two or more consecutive entries in the segment descriptor table, each of the consecutive entries capable of storing segment descriptors having a size equal to a size of the first segment descriptor.

21. The processor as recited in claim 19 wherein a size of a segment descriptor in the segment descriptor table is dependent on a type of the segment descriptor.

22. The processor as recited in claim 19 wherein the second segment descriptor is a call gate descriptor.

23. The processor as recited in claim 19 wherein the second segment descriptor is a local descriptor table (LDT) descriptor.

24. The processor as recited in claim 19 wherein the second segment descriptor is a task state segment (TSS) descriptor.

25. A computer system comprising:

a processor; and a memory coupled to the processor, wherein the memory is configured to store at least one segment descriptor table, the at least one segment descriptor table storing at least a first segment descriptor and a second segment descriptor, wherein the second segment descriptor is larger than the first segment descriptor; and wherein the processor is configured to read the first segment descriptor from the at least one segment descriptor table responsive to a first segment selector that identifies the first segment descriptor in the at least one segment descriptor table, and wherein the processor is configured to read the second segment descriptor from the at least one segment descriptor table responsive to a second segment selector that identifies the second segment descriptor in the at least one segment descriptor table.

26. The computer system as recited in claim 25 wherein the at least one segment descriptor table comprises a plurality of entries, and wherein the first segment descriptor occupies one of the plurality of entries, and wherein the second segment descriptor occupies at least two of the plurality of entries.

27. The computer system as recited in claim 25 wherein a size of a segment descriptor in the at least one segment descriptor table is dependent on a type of the segment descriptor.

28. The computer system as recited in claim 25 wherein the second segment descriptor is a call gate descriptor.

29. The computer system as recited in claim 25 wherein the second segment descriptor is a local descriptor table (LDT) descriptor.

30. The computer system as recited in claim 25 wherein the second segment descriptor is a task state segment (TSS) descriptor.

* * * * *